United States Patent [19]
Lehmler et al.

[11] Patent Number: 5,647,706
[45] Date of Patent: Jul. 15, 1997

[54] DEVICE TO MACHINE WORKPIECE EDGES

[76] Inventors: Hans-Friedrich Lehmler, Ricarda-Huch-Str. 40, 61350 Bad Homburg V.D.H.; Harald Koller, Felchesgasse 40, 64291 Darmstadt, both of Germany; Jukka Gustafson, Heikinpolku 2, 23100 Mynamaki; Kalevi Heino, Sukkulakuja 3 B 23, 20110 Turku, both of Finland

[21] Appl. No.: 358,738

[22] Filed: Dec. 19, 1994

[30] Foreign Application Priority Data

Dec. 18, 1993 [DE] Germany .................. 43 43 327.8

[51] Int. Cl.$^6$ ........................................ B23C 3/12
[52] U.S. Cl. .................. 409/138; 409/163; 409/197; 409/219; 29/56.6; 269/21; 451/388
[58] Field of Search ................. 269/21, 296, 266; 451/388, 43, 44; 409/163, 197, 219, 138; 29/34 B, 56.6

[56] References Cited

U.S. PATENT DOCUMENTS

| | | | |
|---|---|---|---|
| 2,391,511 | 12/1945 | Pioch et al. | 409/197 |
| 2,729,040 | 1/1956 | Wallace et al. | 269/21 |
| 2,925,017 | 2/1960 | Bales et al. | 269/21 |
| 3,711,082 | 1/1973 | Seidenfaden | 269/21 |
| 3,977,298 | 8/1976 | Linsinger | 409/138 |
| 4,018,134 | 4/1977 | Linsinger | 409/138 |
| 4,392,604 | 7/1983 | Sears | 228/212 |
| 4,523,749 | 6/1985 | Kindgren et al. | 269/32 |
| 4,579,321 | 4/1986 | Kawano | 269/61 |
| 4,589,317 | 5/1986 | Kawano | 83/400 |
| 4,691,905 | 9/1987 | Tamura et al. | 269/296 |
| 4,787,787 | 11/1988 | Hopwell et al. | 409/219 |
| 5,002,108 | 3/1991 | Jenkner | 269/21 |
| 5,003,729 | 4/1991 | Sherby | 51/283 R |
| 5,088,181 | 2/1992 | Jeppsson | 29/563 |
| 5,305,992 | 4/1994 | Kish | 269/51 |
| 5,407,415 | 4/1995 | Spishak | 483/4 |
| 5,429,461 | 7/1995 | Mukherjee et al. | 409/163 |
| 5,486,746 | 1/1996 | Suzuki | 318/569 |

Primary Examiner—M. Rachuba
Assistant Examiner—Christopher Kirkman
Attorney, Agent, or Firm—Connolly & Hutz

[57] ABSTRACT

The invention relates to a device to machine workpiece edges with variable dimensions using a device for clamping the workpieces and a machining unit, whereby the device according to the invention is characterized by a first clamping bed with a clamping plate for clamping the workpiece surfaces, a second clamping bed with a clamping plate for clamping the workpiece edges hanging over the first clamping bed and means to change the position and the orientation of the first clamping bed relative to the second clamping bed.

13 Claims, 4 Drawing Sheets

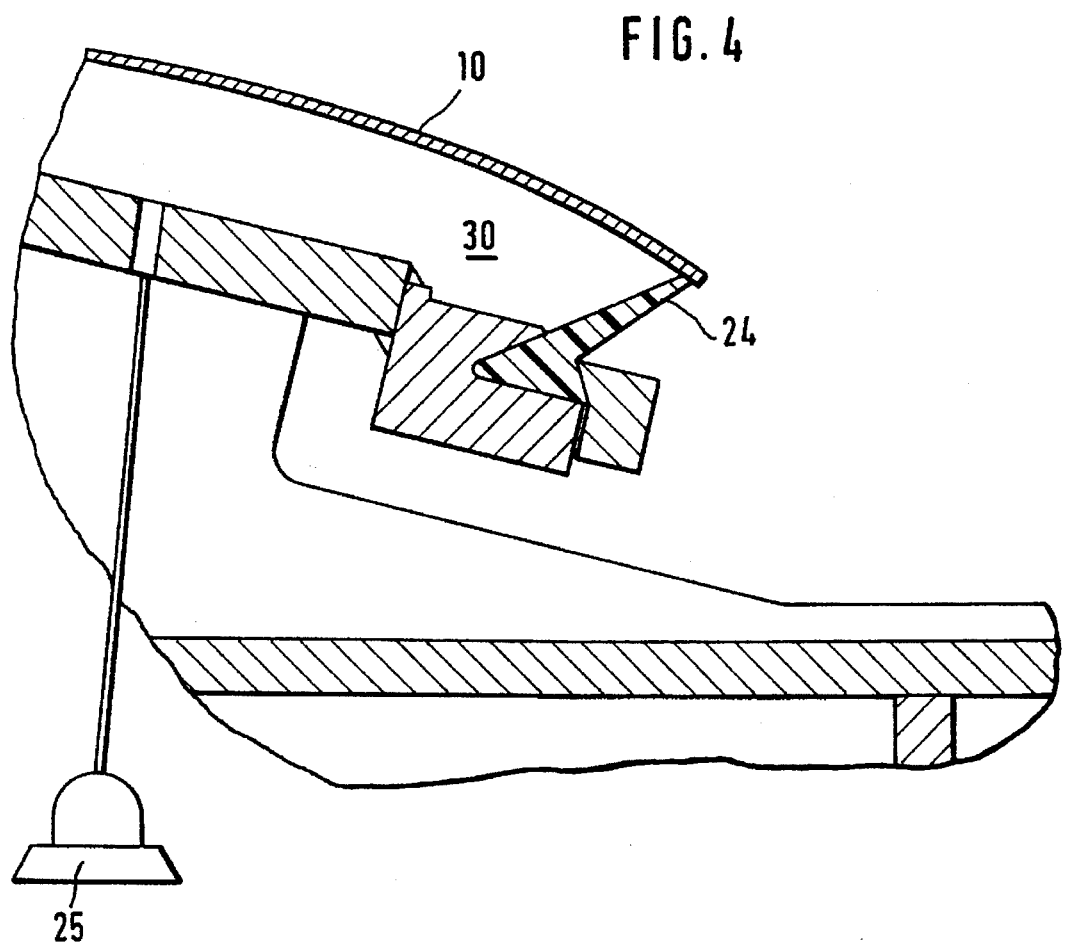

5,647,706

DEVICE TO MACHINE WORKPIECE EDGES

BACKGROUND OF THE INVENTION

The invention relates to a device to machine workpiece edges having variable dimensions using a device for clamping the workpieces and a machining unit.

It is a known procedure to use spherical vessels with diameters up to 40 meters to transport liquefied gases, for example, liquefied natural gas, on ships. These spherical vessels are made up of individual metal sections which are variable over a large range of sizes, depending on the diameter of the spherical vessel. Aluminum is the material used for these parts, which are, for example, 4 meters wide, 11 meters long and between 0.03 and 0.07 meters thick. In order to prepare for welding, it is necessary to provide the edges of the metal sections with a seam. It is known to prepare a seam, for example, an X-shaped or V-shaped seam, on the curved sections by means of milling, whereby the contour to be milled is optically marked, oriented towards the milling unit and outlined by the milling unit one more time by means of optical sedating. A disadvantageous and time-consuming aspect of this is the necessary marking procedure and the manual repositioning and reclamping of the workpiece.

For this reason, it would be desirable to create a device with a clamping device which avoids prior marking and time-consuming, manual handling.

In order to avoid vibration of the workpiece edges to be milled, they would have to be supported and secured as far to the outside as possible by the clamping device. For this purpose, it would be necessary to make a clamping device specifically adapted to every single workpiece contour, which is not economically feasible and which would call for enormous storage areas for the myriad of clamping devices and also entail lengthy retooling times.

The invention is based on the objective of clamping the workpieces into only one device, regardless of their dimensions and shapes.

SUMMARY OF THE INVENTION

The device according to the invention makes it possible to prepare the seams on the metal sections without vibration of the metal edges in just one device consisting of two clamping beds. This translates into an economical machining of metal sections which have large differences in their dimensions, without manual repositioning. As a result, a high level of cost-effectiveness is achieved.

An embodiment of the invention is shown in the drawing and is described in greater detail below.

THE DRAWINGS

FIG. 1 is a top view of the invention for clamping according to the invention,

FIG. 2 a cross section along the Line A—A of FIG. 1,

FIG. 4 is an enlarged view of detail X of FIG. 3.

DETAILED DESCRIPTION

Figure 1:
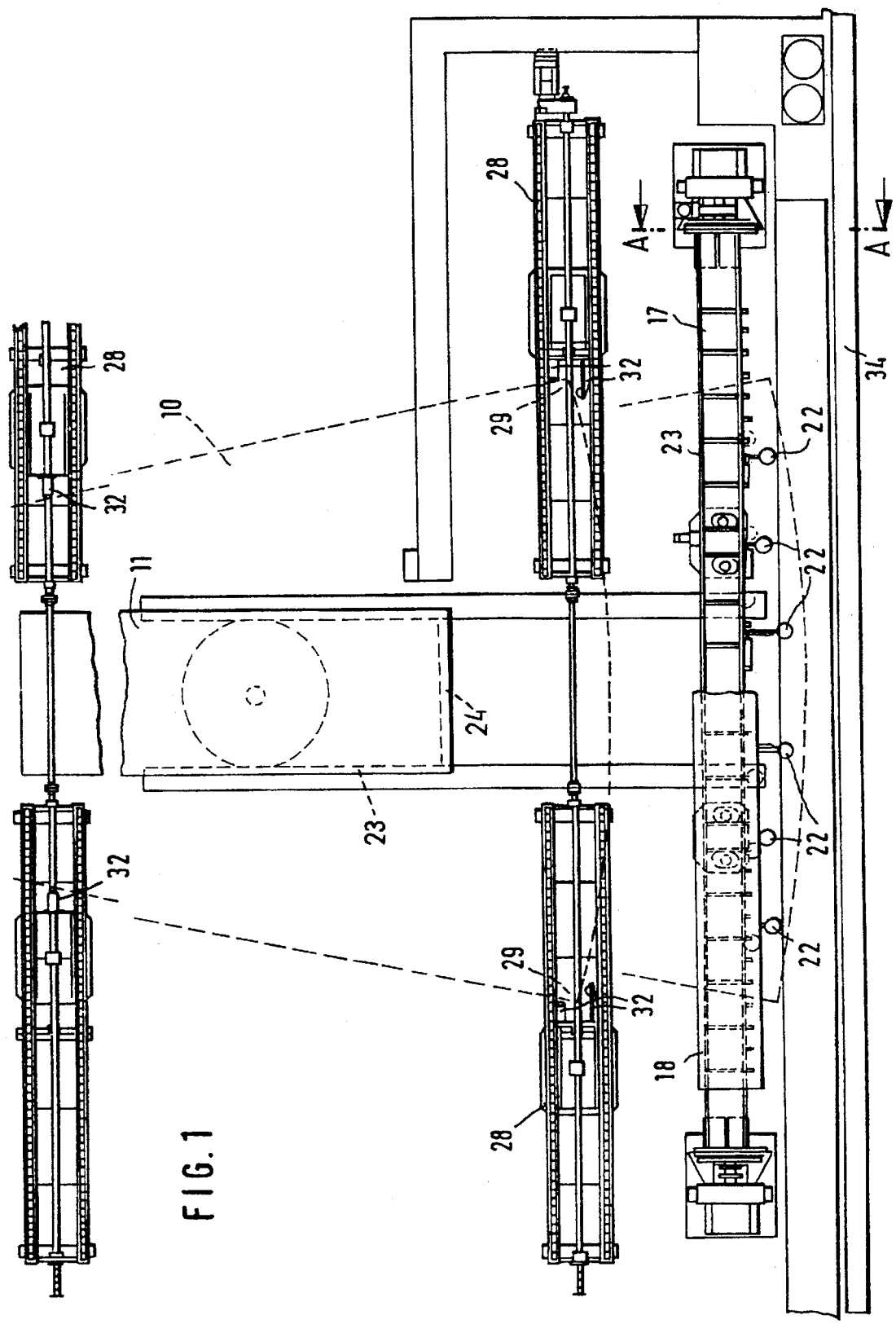
Figure 2:
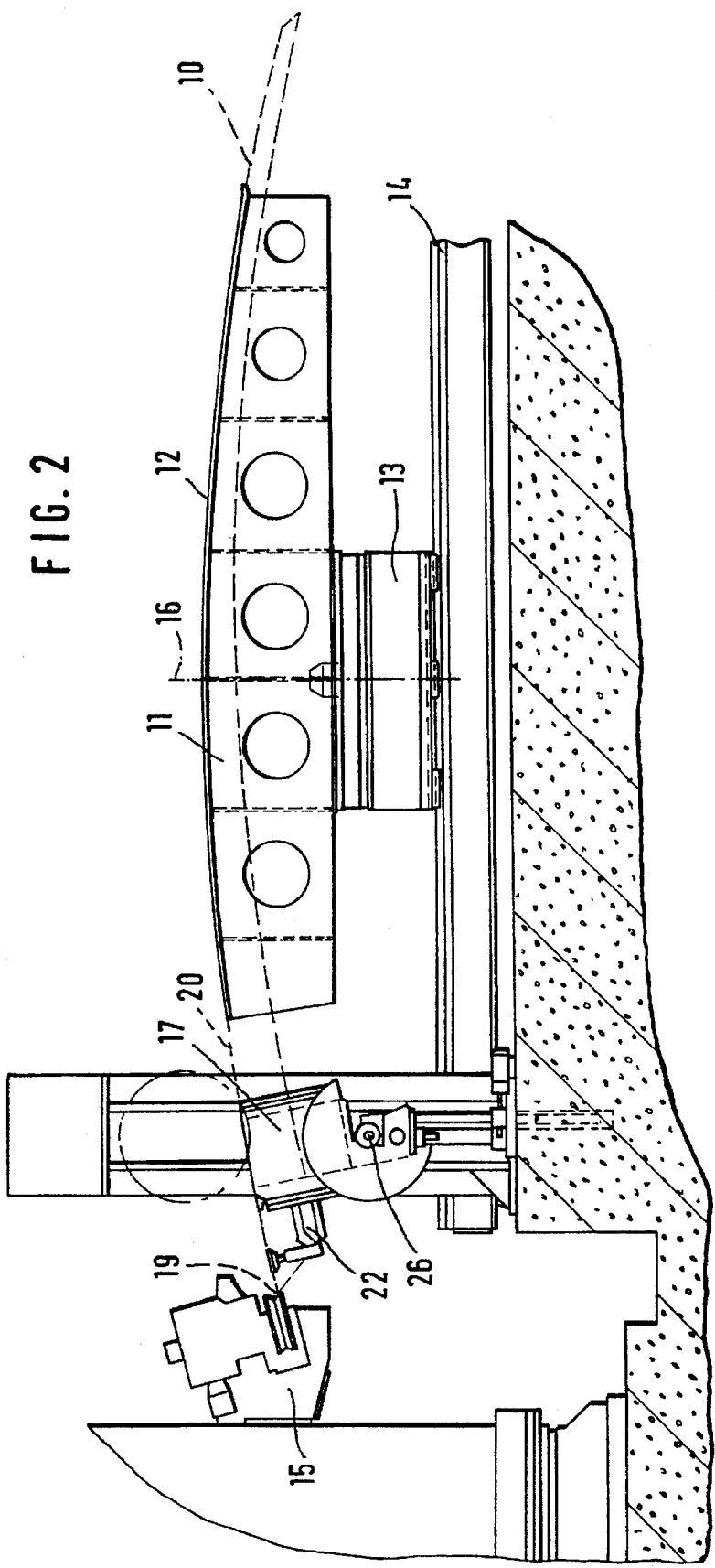
Figure 3:
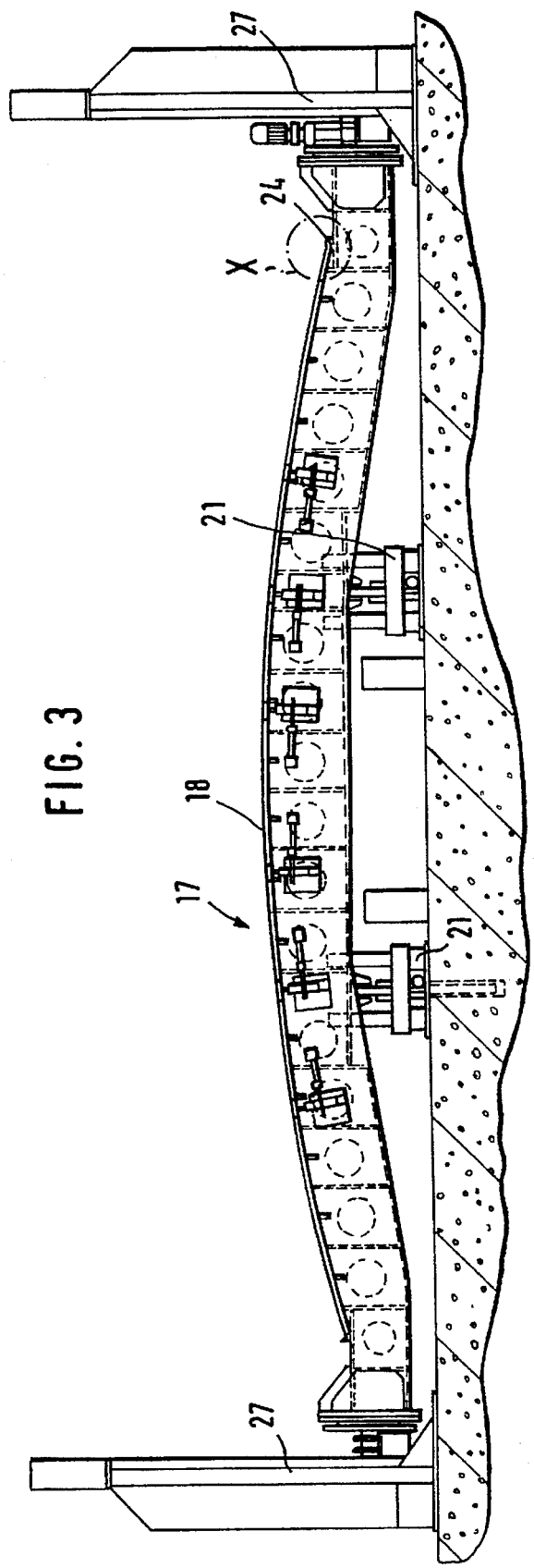
FIG. 3 is a front view of the second clamping bed.

FIGS. 1 through 4 show a device for clamping curved workpieces 10. The clamping device has a first clamping bed 11 with a curved clamping plate 12 which supports the workpiece 10 in the middle. The clamping bed 11 is positioned on a manipulator 13 which can traverse in a straight line along rails and which can be rotated around the axis 16.

In the straight-line traversing axis of the first clamping bed 11, there is a second clamping bed 17 having a curved clamping plate 18 positioned perpendicular to the first clamping bed 11, each of which supports one workpiece edge 19 in the overhanging area 20. In front of the second clamping bed 17, the trajectory 34 of the machining unit 15 runs perpendicular to the straight-line traversing device of the manipulator 13. As the machining unit 15, preferably a milling machine is used which can be moved or swiveled in at least five numerically controlled axes. The second clamping table 17 has means such as lifting jacks 27 and rotating axles 26 for changing the height and for changing the angle position of the clamping plate 18. In addition, there are support units 21 on the second clamping bed 17 The support units 21 are placed underneath the second clamping bed 17 in order to compensate for an elastic deflection of the second clamping bed 17 and in order to prevent vibrations. In an advantageous manner, there are also swiveling support and/or clamping elements 22 on the second clamping bed 17 and, in the case of workpiece edges 19 (FIG. 1) which are net straight, said elements are brought into position to support the parts of the workpiece which protrude over the second clamping bed 17.

As FIGS. 1 and 4 show, the clamping plates 12, 18 have longitudinal seals 23 and adjustable crosswise seals 24 which face upwards and bear the workpieces 10. At least one vacuum pump 25 is connected to the space 30 which is formed between the clamping plates 12 and 18 and the workpieces, and which is delimited by the seals 23, 24.

Securing units 28 are associated with the first clamping bed 11 next to the manipulator 13, by means of which the position of the workpieces 10 is oriented prior to being clamped.

As FIG. 1 shows, the curved workpieces 10 are laid onto the first clamping bed 11 in such a way that they lie on the longitudinal and crosswise seals 23, 24 of the clamping plate 12. Subsequently, the workpieces are oriented in the securing units 28 with respect to the workpiece edges 29 and sides. In this process, the workpieces 10 are positioned against stops 32 so that they occupy an essentially centered position on the clamping plate 12. Then the vacuum pump 25 is switched on and the workpiece 10 is secured onto the clamping plate 12 by means of the negative pressure generated in the spaces 30. The securing units 28 are then pulled back perpendicularly to the straight-line traversing device of the manipulator 13. The manipulator 13 traverses on the rails 14 in the direction of the second clamping bed 17 and positions one workpiece edge 19 at a time parallel to the trajectory 34 of the machining unit 15. The second clamping bed 19 supports the area 20 of the workpiece 10 which hangs over the clamping plate 12. For this purpose, its height can be adjusted by means of lifting jacks 27 and its angle position can be adjusted along the workpiece contour. On the second clamping bed 17, the workpiece edge 19 to be milled is clamped onto the clamping plate 18 by generating a negative pressure as described above. In this process, the additional support units 21 compensate for the elastic deflection of the second clamping bed 17 and prevent vibrations.

Insofar as the individual workpieces 10 are not straight in the overhanging area 20, as shown in FIG. 1, the workpiece parts which extend over the clamping plate 18 are supported or held by means of additional, swiveling support and/or clamping elements 22.

For this purpose, the clamping beds 11, 17, the means 13, 26, 27, the support units 21, the machining unit 15 and the support and/or clamping elements 22 are all connected to a control 31. The control 31 automatically effectuates all of the positions of the second clamping bed 17 in connection with the height and angle position of the means 26, 27, support units 21 and support and/or clamping elements 22 and coordinates these elements with the program of the machining unit 15 in question and the means 13 of the first clamping bed 11.

What is claimed is:

1. A device for machining the workpiece edges of a workpiece having variable dimensions comprising a first clamping bed having a clamping plate for supporting the undersurface of the workpiece with portions of the workpiece along the edges of the workpiece overhanging the clamping plate of the first clamping bed, the first clamping bed including clamping elements for clamping the workpiece against the clamping plate of the first clamping bed, a second clamping bed having a clamping plate for supporting the undersurface of the workpiece adjacent to a workpiece edge overhanging the clamping plate of the first clamping bed, the second clamping bed including clamping elements for clamping the workpiece against the clamping plate of the second clamping bed, the first clamping bed being selectively movable toward and away from the second clamping bed to selectively dispose the workpiece in a first position supported only by the first clamping bed and to dispose the workpiece in a second position supported by both the first clamping bed and the second clamping bed, the first clamping bed being rotatable about a vertical axis to selectively dispose different edges of the workpiece at the second clamping bed, a machining unit located outwardly of the clamping plate of the second clamping bed for contacting the exposed edge of the workpiece at the overhanging portion of the workpiece supported by the second clamping bed, and the machining unit being relatively movable at and along the clamping plate of the second clamping bed to selectively machine each exposed edge of the workpiece at the overhanging portion of the workpiece supported by the clamping plate of the second clamping bed.

2. Device according to claim 1, characterized in that the clamping plates have longitudinal and crosswise seals which face upwards to support the workpiece, and the clamping elements include vacuum pump means for communicating with the space that is formed between the clamping plates and the workpiece and that is delimited by the seals.

3. Device according to claim 2, characterized in that the clamping plates of the clamping beds have a curved surface.

4. Device according to claim 3, characterized in that adjusting means is located at the second clamping bed to change the height and to change the angle position of the clamping plate of the second clamping bed.

5. Device according to claim 4, characterized in that there are swiveling support elements on the second clamping bed.

6. Device according to claim 5, further comprising securing units for positioning the workpiece on the first clamping bed.

7. Device according to claim 6, further comprising support units to prevent vibrations and deflection of the clamping plate of the second clamping bed.

8. Device according to claim 7, characterized in that the clamping beds, the adjusting means, the support units, the machining unit and the support elements are all connected to a control, and the control automatically effectuates all of the positions of the second clamping bed in connection with the height and angle position of the adjusting means, support units and support elements for coordination with the program of the machining unit and the positioning of the first clamping bed.

9. Device according to claim 1, characterized in that the clamping plates of the clamping beds have a curved surface.

10. Device according to claim 1, characterized in that adjusting means is located at the second clamping bed to change the height and to change the angle position of the clamping plate of the second clamping bed.

11. Device according to claim 1, characterized in that there is swiveling support on the second clamping bed.

12. Device according to claim 1, further comprising securing units for positioning the workpieces on the first clamping bed.

13. Device according to claim 1, further comprising support units to prevent vibrations and deflection of the clamping plate of the second clamping bed.

* * * * *